US009164938B2

(12) United States Patent
Acharya et al.

(10) Patent No.: US 9,164,938 B2
(45) Date of Patent: Oct. 20, 2015

(54) METHOD TO INTEGRATE ARM ECOSYSTEM IPS INTO PCI-BASED INTERCONNECT

(71) Applicant: Intel Corporation, Santa Clara, CA (US)

(72) Inventors: Satish B. Acharya, Bangalore (IN); Achmed R. Zahir, Menlo Park, CA (US); Sean G. Galloway, Orangevale, CA (US)

(73) Assignee: Intel Corporation, Santa Clara, CA (US)

( * ) Notice: Subject to any disclaimer, the term of this patent is extended or adjusted under 35 U.S.C. 154(b) by 367 days.

(21) Appl. No.: 13/732,955

(22) Filed: Jan. 2, 2013

(65) Prior Publication Data

US 2014/0189187 A1  Jul. 3, 2014

(51) Int. Cl.
*G06F 13/38* (2006.01)

(52) U.S. Cl.
CPC ...... *G06F 13/385* (2013.01); *G06F 2213/3852* (2013.01)

(58) Field of Classification Search
CPC . G06F 13/385; G06F 13/387; G06F 13/4027; G06F 2213/3852
USPC .......................................................... 710/315
See application file for complete search history.

(56) References Cited

U.S. PATENT DOCUMENTS

| 7,861,027 | B2 * | 12/2010 | Shoemaker et al. | 710/313 |
| 2007/0055808 | A1 * | 3/2007 | Asaro | 710/315 |
| 2013/0086287 | A1 * | 4/2013 | Fleming et al. | 710/105 |

FOREIGN PATENT DOCUMENTS

| TW | 201003410 A1 | 1/2010 |
| WO | WO 2012143947 A2 * | 10/2012 |

OTHER PUBLICATIONS

Office Action received for Taiwan Patent Application No. 102148254, mailed on Mar. 25, 2015, 4 pages of Taiwan Office Action only.

* cited by examiner

*Primary Examiner* — Glenn A Auve
(74) *Attorney, Agent, or Firm* — Law Office of R. Alan Burnett, PS

(57) ABSTRACT

Methods and apparatus for integrating ARM-based IPs in computer system employing PCI-based fabrics. An PCI-based fabric is operatively coupled to an ARM-based ecosystem employing an ARM-based fabric such as OCP, AHB, or BVCI via a corresponding fabric-to-fabric bridge. Transactions between IP operatively coupled to the PCI-based fabric and IP in the ARM-based ecosystem are facilitated by applying applicable ordering and conversions operations via the fabric-to-fabric bridge and/or fabrics. For example, posted writes originating from IP coupled to the PCI-based fabric are converted to non-posted writes and serialized via the fabric-to-fabric bridge and forwarded to the ARM-based ecosystem.

37 Claims, 12 Drawing Sheets

METHOD TO INTEGRATE ARM ECOSYSTEM IPS INTO PCI-BASED INTERCONNECT

FIELD OF THE INVENTION

The field of invention relates generally to computer systems and, more specifically but not exclusively relates to techniques for integrating ARM-based IPs in a computer system employing a PCI-based interconnect fabric.

BACKGROUND INFORMATION

Computer systems typically employ one or more interconnects to facilitate communication between system components, such as between processors and memory. Interconnects and/or expansion interfaces may also be used to support built-in and add on devices, such as IO (input/output) devices and expansion cards and the like. For many years after the personal computer was introduced, the primary form of interconnect was a parallel bus. Parallel bus structures were used for both internal data transfers and expansion buses, such as ISA (Industry Standard Architecture), MCA (Micro Channel Architecture), EISA (Extended Industry Standard Architecture) and VESA Local Bus. In the early 1990's Intel® Corporation introduced the PCI (Peripheral Component Interconnect) computer bus. PCI improved on earlier bus technologies by not only increasing the bus speed, but also introducing automatic configuration and transaction-based data transfers using shared address and data lines.

As time progressed, computer processor clock rates where increasing at a faster pace than parallel bus clock rates. As a result, computer workloads were often limited by interconnect bottlenecks rather than processor speed. Although parallel buses support the transfer of a large amount of data (e.g., 32 or even 64 bits under PCI-X) with each cycle, their clock rates are limited by timing skew considerations, leading to a practical limit to maximum bus speed. To overcome this problem, high-speed serial interconnects were developed. Examples of early serial interconnects include Serial ATA, USB (Universal Serial Bus), FireWire, and RapidIO.

Another standard serial interconnect that is widely used is PCI Express, also called PCIe, which was introduced in 2004 under the PCIe 1.0 standard. PCIe was designed to replace older PCI and PCI-X standards, while providing legacy support. PCIe employs point-to-point serial links rather than a shared parallel bus architecture. Each link supports a point-to-point communication channel between two PCIe ports using one or more lanes, with each lane comprising a bi-directional serial link. The lanes are physically routed using a crossbar switch architecture, which supports communication between multiple devices at the same time. As a result of its inherent advantages, PCIe has replaced PCI as the most prevalent interconnect in today's personal computers. PCIe is an industry standard managed by the PCI-SIG (Special Interest Group). As such, PCIe pads are available from many ASIC and silicon vendors.

The PCI specification introduced the concept of a posted transaction to improve performance. However, this also resulted in a set of transaction ordering rules to ensure data coherency and prevent deadlocks. Data coherency is required for correct operation of Producer-Consumer model. The transaction ordering rules also exist PCI-Express interconnects. The transaction ordering rules are also embedded in on-die interconnects to connect various PCI/PCIe devices. One of the characteristics of PCI based interconnects is write data and read return data share the same data path in each direction.

While Intel®-based architectures (e.g., IA-32) have dominated the desktop, server, laptop, and notebook markets, the most common architectures employed by devices in the mobile space (e.g., mobile phones and tablets) are ARM-based architectures. Platforms based on ARM-based architectures typically employ one or more of Advanced Microcontroller Bus Architecture (AMBA) (e.g., Advanced High-performance Bus (AHB)), Open Core Protocol (OCP), and Basic Virtual Component Interface (BVCI) interconnects. These interconnects have a completely different set of transaction ordering rules (as compared with PCI/PCIe), and typically employ separate write and read return data buses. As a result, when a PCI-based on-die interconnect is used to attach a device employing one of these ARM-based interconnects or vice-versa, several problems related to data coherency arise due to differences in transaction ordering rules and interconnect topologies. Accordingly, this makes it difficult to mix PCI/PCIe and ARM-based interconnects and devices.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 6b is a flowchart illustrating operations depicted by corresponding numbered message flows in FIG. 6a;

FIG. 7b is a flowchart illustrating operations depicted by corresponding numbered message flows in FIG. 7a;

DETAILED DESCRIPTION

Embodiments of methods and apparatus for integrating ARM-based IPs in a computer system employing PCI-based fabrics are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The teachings and principles disclosed herein provide techniques for integrating ARM-based IPs (Intellectual Property, also referred to as IP blocks, logic, or components) in computer systems employing PCI-based fabrics. As used herein, an IP block is representative of a block or logical group of circuitry that typically serves one or more targeted functions and comprise logic that is either developed in-house or licensed from a third-party. IP blocks are also commonly referred to as functional blocks or "IP." As used herein, a PCI-based fabric means that data transactions, such as memory writes, are based on aspects of the PCI protocol(s) and PCI ordering rules for such transactions, while the physical interconnect structure of the fabric may or may not adhere to the physical structure defined by a particular PCI or PCIe standard. Moreover, the physical interconnect structure may apply to both existing and future interconnect structures. In addition, the techniques may be applied to integrate other types of IP (i.e., non-ARM-based IP) that are coupled to an OCP fabric. For convenience and simplicity, the terminology OCP/AHB is used herein to convey use a fabrics and bridges that employ either an OCP fabric or an ARM-based interconnect such as AHB. It will be recognized by those skilled in the art that other types of interconnects that are common to ARM-based ecosystems may also be used in place of AHB, such as any of the AMBA interconnects or a BVCI interconnect.

Figure 1:
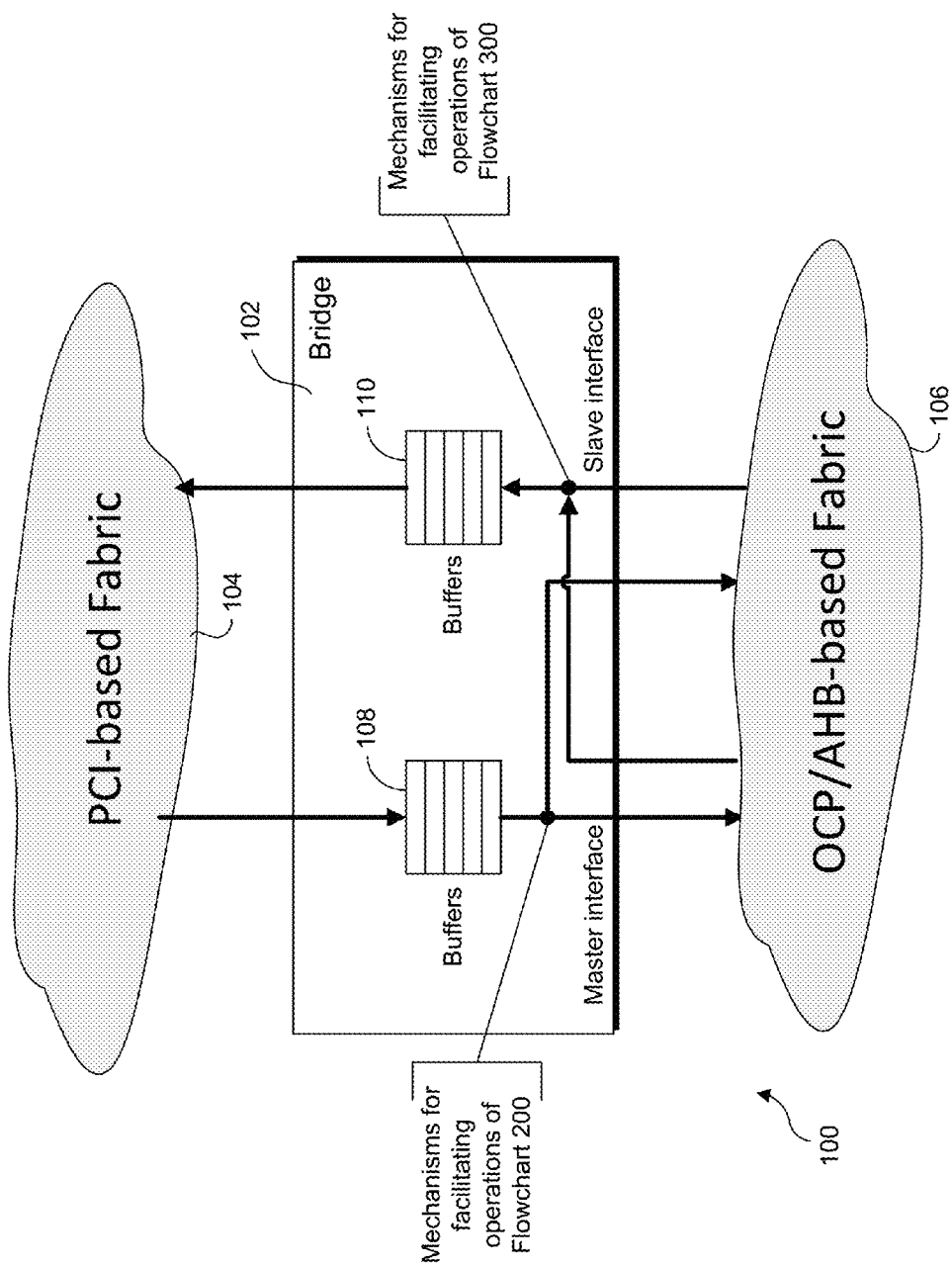
FIG. 1 shows a high-level overview of an architecture employing a PCI-based fabric operatively coupled to an OCP/AHB-based fabric via a PCI-based fabric-to-OCP/AHB fabric bridge.

A high-level overview of an architecture 100 including a PCI-to-OCP/AHB bridge 102 that is configured to facilitate communication between a PCI-based fabric 104 and an OCP/AHB-based fabric 106 is shown in FIG. 1. PCI-to-OCP/AHB bridge 102 includes a set of buffers 108 employed for transactions flowing from PCI-based fabric 104 to OCP/AHB-based fabric 106, and a set of buffers 110 employed for transactions flowing from OCP/AHB-based fabric 106 to PCI-based fabric 104. Also depicted are mechanisms for facilitating operations associated with flowchart 200 of FIG. 2 and operations associated with flowchart 300 of FIG. 3, as described below.

Generally, the illustrated components and associated operations for architecture 100 may be implemented for facilitating transactions between IP coupled to PCI-based fabric 104 and IP coupled to OCP/AHB-based fabric 106. As discussed above, PCI-based fabric 104 is illustrative of various types of fabrics that implement transactions in accordance with a PCI or PCIe transaction ordering rules, while OCP/AHB-based fabric is illustrative of various types of fabrics employed in an ARM ecosystem, including but not limited to fabrics employing one or more of OCP, AHB (or other AMBA interconnects), and BVCI interconnects.

The AMBA protocol is an open standard, on-chip interconnect specification for the connection and management of functional blocks in a System-on-Chip (SoC). It enables development of multi-processor designs with large numbers of controllers and peripherals. AMBA was introduced by ARM Ltd in 1996. The first AMBA buses were Advanced System Bus (ASB) and Advanced Peripheral Bus (APB). In its 2nd version, AMBA 2, ARM added AMBA High-performance Bus (AHB) that is a single clock-edge protocol. In 2003, ARM introduced the 3rd generation, AMBA 3, including the Advanced eXtensible Interface (AXI) to reach even higher performance interconnect and the Advanced Trace Bus (ATB) as part of the CoreSight on-chip debug and trace solution. AXI, the third generation of AMBA interface defined in the AMBA 3 specification, is targeted at high performance, high clock frequency system designs and includes features which make it very suitable for high speed sub-micrometer interconnect. AHB is a bus protocol introduced in Advanced Microcontroller Bus Architecture version 2 published by ARM Ltd company. AHB-Lite is a subset of AHB which is formally defined in the AMBA 3 standard. This subset simplifies the design for a bus with a single master. APB is designed for low bandwidth control accesses, for example register interfaces on system peripherals. This bus has an address and data phase similar to AHB, but a much reduced, low complexity signal list (for example no bursts).

The VCI (Virtual Component Interface) standard is the result of the work of the On-Chip Bus (OCB) Development Working Group (DWG) of the Virtual Socket Interface Alliance (VSIA). The charter defined for the OCB DWG was to define an on-chip bus related specification for the design, integration, and test of multiple functional blocks on a single piece of silicon. VCI is an interface rather than a bus. Thus the VCI standard specifies: a) a request-response protocol; b) a protocol for the transfer of requests and responses; and c) the contents and coding of these requests and responses. The VCI does not touch areas as bus allocation schemes, competing for a bus, and so forth. There are three complexity levels for the VCI: Peripheral (PVCI), Basic VCI (BVCI), and Advanced VCI (AVCI). The PVCI provides a simple, easily implementable interface for applications that do not need all the features of the BVCI. The BVCI defines an interface that is suitable for most applications. It has a powerful, but not overly complex protocol. The AVCI adds more sophisticated features, such as threads, to support high-performance applications. The PVCI is a subset of the BVCI, and the AVCI is a superset of the BVCI. As an interface, the VCI can be used as a point-to-point connection between two units called the initiator and the target, where the initiator issues a request and the target responds. The VCI can be used as the interface to a wrapper, which means a connection to a bus. This is how the VCI allows the VC to be connected to any bus. An initiator is connected to that bus by using a bus initiator wrapper. A target is connected to that bus by using a bus target wrapper.

In addition to different architecture design aspects, each of PCI, AMBA, and BVCI have their own set of transaction ordering rules. For example, AHB and APB have similar transaction ordering rules. All requests are in-order. A system designer can implement an AHB write transaction as posted or non-posted, depending on who generates a response for request/data phases. There can be a single outstanding transaction. BVCI allows multiple outstanding requests but responses are in same order as order of corresponding requests. PCI has advanced transaction ordering rules, including support for posted or non-posted write transactions. Further details of the ordering rules are discussed below.

Figure 2:
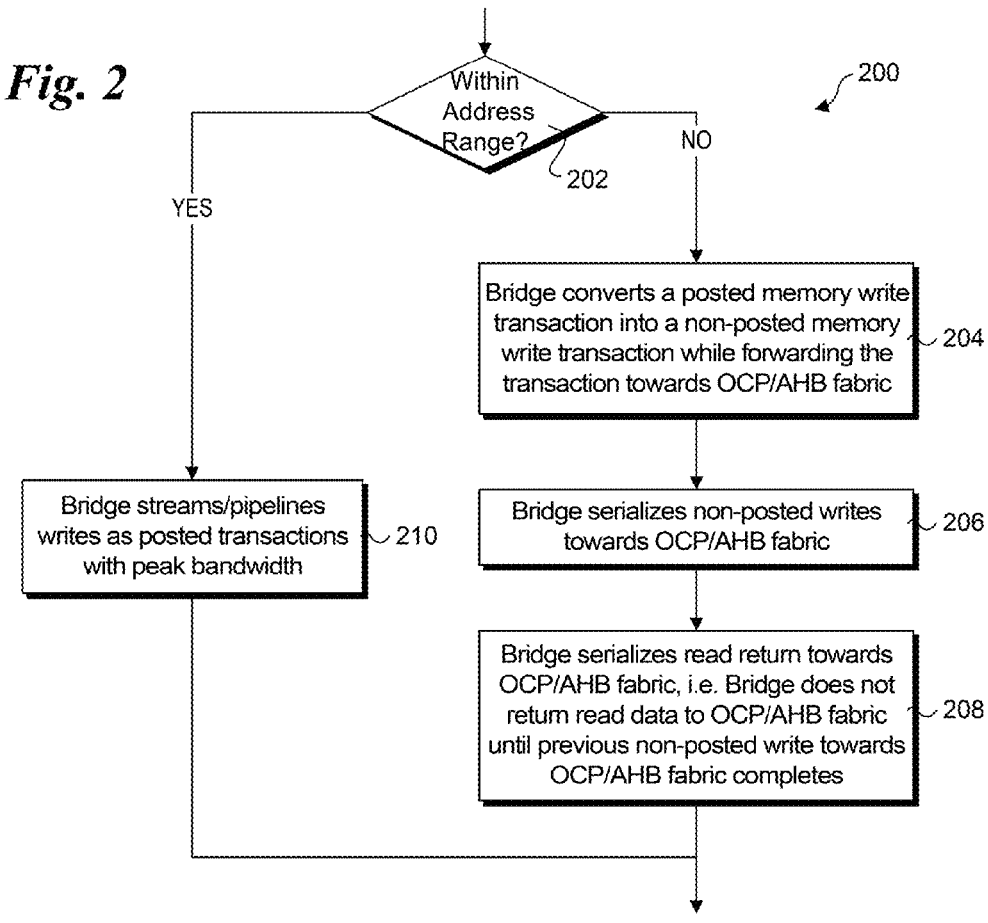
FIG. 2 is a flowchart illustrating operations performed during a downstream memory write transaction originating at an IP connected to the PCI-based fabric and destined for an IP connected to the OCP/AHB-based fabric, according to one embodiment.

FIG. 2 shows a flowchart 200 depicting operations for facilitating transactions originating at an IP coupled to PCI-based fabric 104 targeted to an IP coupled to OCP/AHB-based fabric 106, according to one embodiment. The process begins at a decision block 202, where a determination is made to whether the address for the transaction falls within one or more predefined address ranges. In one embodiment, one or more sets of registers (e.g., 1, 2, 4, etc.) are used to defined the start and end addresses of each address range. If the answer is NO, PCI-to-OCP/AHB bridge 102 converts a posted memory write transaction into a non-posted memory write transaction while forwarding the transaction towards OCP/AHB-based fabric 106, as depicted in a block 204. Details of this process are described below. In a block 206, PCI-to-OCP/AHB bridge 102 serializes non-posted writes towards OCP/AHB-based fabric 106. In a block 208, PCI-to-OCP/AHB bridge 102 serializes read return towards OCP/AHB-based fabric 106 such that the bridge does not return read data to the OCP/AHB-based fabric 106 until previous non-posted writes toward OCP/AHB-based fabric 106 have been completed.

Returning to decision block 202, if the address is within a specified address range, the writes are streamed or pipelined. This is depicted in FIG. 2 with the logic proceeding to a block 210, wherein PCI-to-OCP/AHB bridge 102 streams or pipeline writes as posted transactions with peak bandwidth. Streaming or pipelining writes improves performance over the serialized non-posted writes scheme, since multiple writes may be issued without having to wait for a response to each write.

Figure 3:
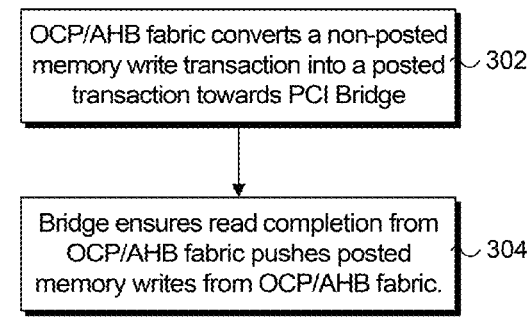
FIG. 3 is a is a flowchart illustrating operations performed during an upstream memory write transaction originating at an IP connected to the OCP/AHB-based fabric and destined for an IP connected to the PCI-based fabric, according to one embodiment.

FIG. 3 shows a flowchart 300 depicting operations for facilitating transactions originating at an IP coupled to OCP/AHB-based fabric 106 targeted to an IP coupled to PCI-based fabric 104, according to one embodiment. In a block 302, PCI-to-OCP/AHB bridge 102 converts an OCP/AHB non-posted memory write transaction into a posted transaction towards the PCI portion of bridge 102. In a block 304, PCI-to-OCP/AHB bridge 102 ensures read completion from OCP/AHB-based fabric 106 by pushing posted memory writes from OCP/AHB-based fabric 106.

One example of a PCI-based fabric is the Intel On-chip Scalable Fabric (IOSF). IOSF is a new interconnect developed by Intel® to address modularity within components targeted at several market segments. It is a non-coherent interconnect and supports off-the-shelf shrink-wrap OS such as Windows. It is topology independent and intended for use as an on-die interconnect. It is leveraged off of PCIe concepts and supports the PCI transaction ordering model.

An example of an OCP/AHB-based fabric is an OCP fabric. OCP is an industry standard and is an open socket protocol. OCP defines a bus-independent, configurable and scalable interface for on-chip subsystem communications. It is widely used in the industry in System on a Chip (SoC) architectures. It is a protocol for a point-to-point link and, unlike IOSF, it does not support any shrink-wrapped OS.

Figure 4:
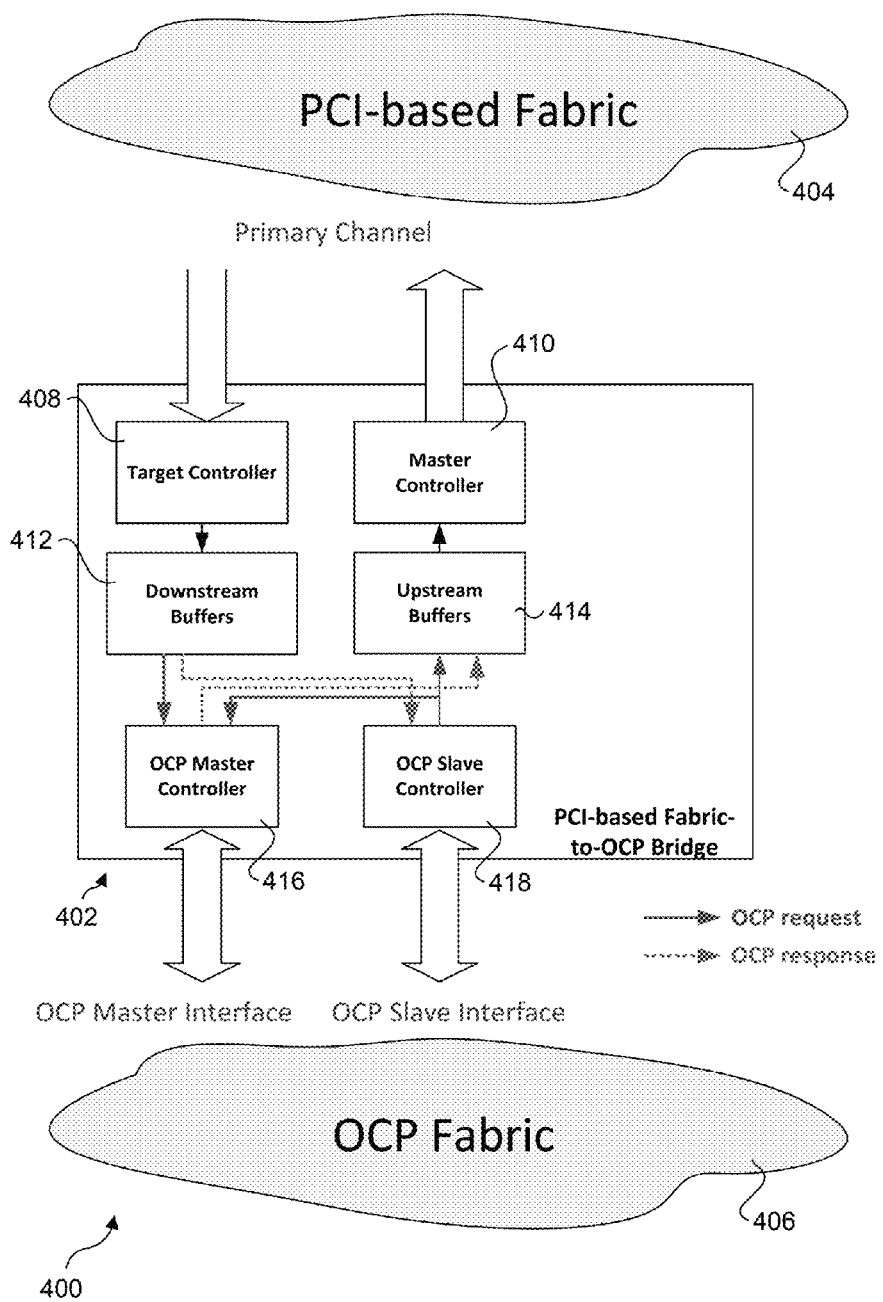
FIG. 4 is a block schematic diagram illustrating a simplified configuration of a PCI-based fabric-to-OCP/AHB fabric bridge, according to one embodiment.

FIG. 4 illustrates an exemplary architecture 400 including a PCI-BASED FABRIC-to-OCP bridge 402 that is configured to facilitate transactions between IP connected to a PCI-based fabric 404 and an ARM-ecosystem fabric comprising an OCP fabric 406. PCI-based fabric 404 employs n PCI-based fabric interface comprising a primary channel that is configured to send and receive data. OCP fabric 406 employs master and slave interfaces that are implemented in accordance with the OCP protocol.

Figure 5:
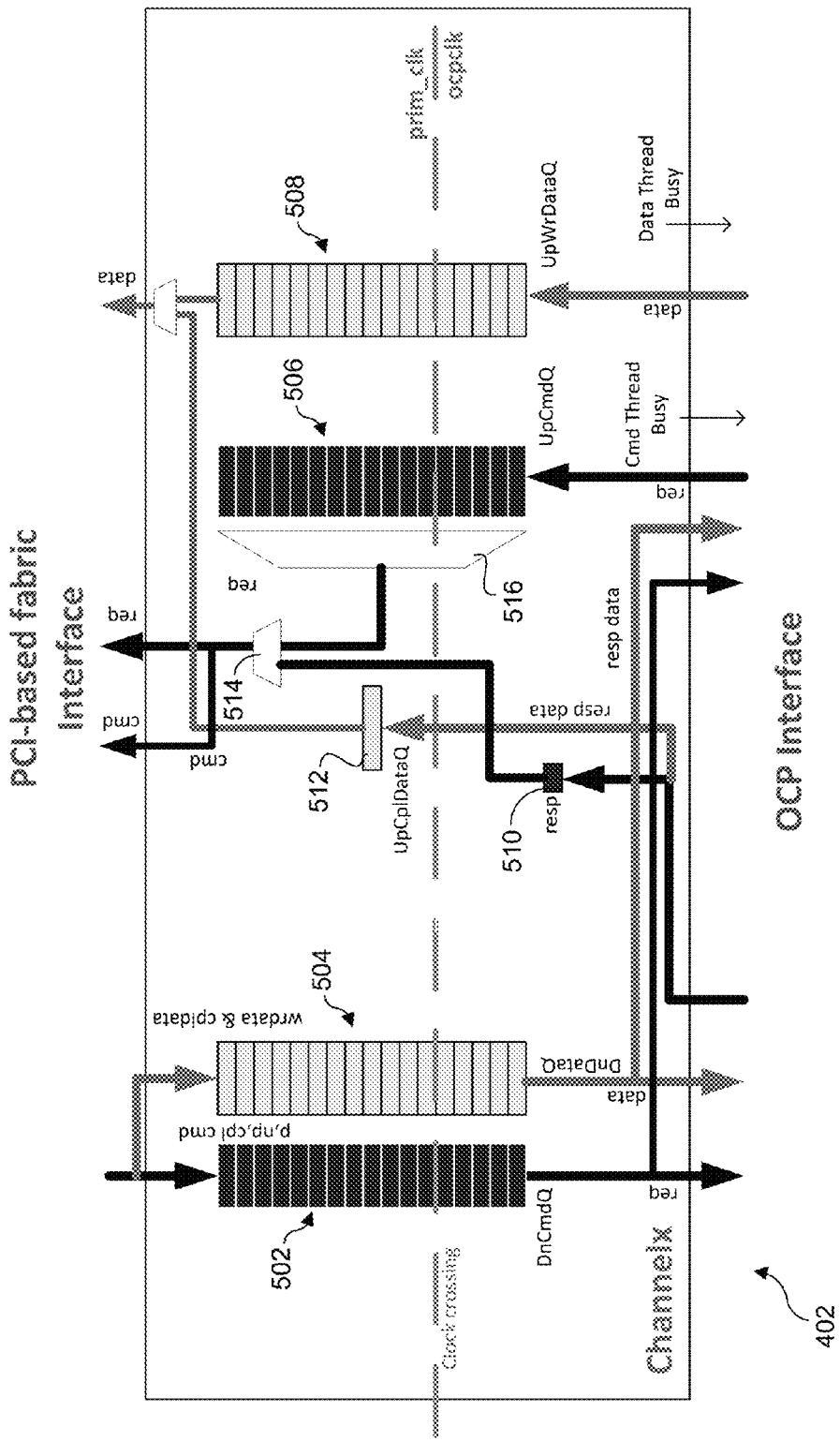
FIG. 5 is a schematic diagram illustrating further details of a PCI-based fabric-to-OCP/AHB fabric bridge, according to one embodiment.

FIG. 4 depicts a simplified view of PCI-based fabric-to-OCP bridge 402, while a more detailed illustration is shown in FIG. 5. In the simplified view, PCI-based fabric-to-OCP bridge 402 is depicted as including a PCI-based fabric target controller 408, a PCI-based fabric Master controller 410, downstream buffers 412, upstream buffers 414, an OCP master controller 416, and an OCP slave controller 418.

FIG. 5 shows further details of PCI-based fabric-to-OCP bridge 402, according to one embodiment. As illustrated, the top of PCI-based fabric-to-OCP bridge 402 is interfaced with a PCI-based fabric interface, while the bottom of PCI-based fabric-to-OCP bridge 402 is interfaced with an OCP interface. Accordingly, transaction data that flows from the PCI-based fabric interface to the OCP interface is referred to as downstream data, while transaction data that flows from the OCP interface to the PCI-based fabric interface is referred to as upstream data. In addition, the illustrated details of PCI-based fabric-to-OCP bridge 402 correspond to an interface to a single OCP thread (depicted as Channelx); additional replications of these components may be implemented to support PCI-based fabric bridging to multiple OCP threads.

Downstream buffers 412 of FIG. 4 include a Downstream Command Queue (DnCmdQ) 502 and a Downstream Data Queue (DnDataQ) 504. Each posted (p) write, non-posted (np) write and completion (c or cpl) includes a corresponding command (respectively depicted as p, np, and cpl cmd) and associated write or completion data (wrdata & cpldata). Each of DnCmdQ 502 and DnDataQ 504A are implemented as FIFO (First-in, First-out) buffers, and a command and its associated data are advanced through these FIFOs in unison.

On the OCP interface side, command data corresponds to an OCP request (req) while wrdata & cpldata correspond to data associated with the request. As depicted, the request and associated data are received at separate interconnect portions of the OCP interface and may be multiplexed.

The upstream data flow paths from the OCP interface to the PCI-based fabric interface are somewhat similar for write requests, while additional logic and routing is implemented for response (resp) (to PCI-based fabric write requests) data and completions. Upstream buffers 414 of FIG. 4 are further depicted in FIG. 5 as including an Upstream Command Queue (UpCmdQ) 506 and an Upstream Write Data Queue (UpWrDataQ) 508. As before, each of these queues is implemented as a FIFO buffer, with commands and associated data advancing through the FIFOs in unison. Additional components for facilitating upstream data flows include a resp(onse) queue 510, an Upstream Completion Data Queue (UpCplDataQ) 512, and multiplexers 514, 516, and 518.

In some embodiments, an optional clock crossing domain is implemented. In the embodiment illustrated in FIG. 5, the PCI-based fabric interface operates at the same clock rate as the primary clock (prim_clk) used for other high-speed SoC logic coupled to the PCI-based fabric. Meanwhile, OCP fabrics typically operate at a lower clock rate (ocpclk). Accordingly, a clock crossing domain is implemented to account for the difference between the clock rates of prim_clk and ocp-clk. In one embodiment, the clock crossing domain is implemented via timing operations employed for advancing data in the FIFO buffers; such techniques for implementing cross clocking domains within FIFO buffers are well-known in the art, and accordingly no further details are provided herein.

PCIe employs the concept of Virtual Channels to provide differentiation of service. Transactions in different Virtual Channels have no ordering with respect to each other. A PCIe device uses a Traffic Class attribute with every request. A PCIe switch or root-complex can use the traffic class attribute to map the request to a Virtual Channel via TC/VC mapping.

In one embodiment, the PCI-based fabric has a concept of Channels to provide differentiation of service and to denote independent traffic streams. A primary interface of a PCI-based fabric agent can represent one or more external ports or independent functions. In such a case, transactions from each port/function can be associated with a different channel. This exposes native requests from each port/function to the fabric and allows the fabric to make appropriate implementation specific arbitration decisions. Alternatively, this arbitration, between requests requiring the same class of service but emanating from independent ports/functions, can be performed within the PCI-based fabric agent and the agent can expose corresponding requests using a single channel to PCI-based fabric.

OCP employs a similar capability called Threads, wherein multiple Threads with independent flow control are used to provide service differentiation. In one embodiment of a PCI-based fabric, typically, there may be the same number of Channels as Master and Target, although this is not necessary. OCP does not have such a requirement. In OCP, a Thread is a local concept between a Master and a Slave.

The PCI-based fabric follows the PCI transaction ordering rules within a channel. There is no ordering relationship among transactions in different channels. OCP requires strict ordering within a Thread when Tags (as defined in OCP) are not used. In addition, read completions and writes in a given direction have no ordering relationship among each other and take independent paths. In OCP, there is no ordering relationship among transactions in different Threads.

OCP requires strict ordering while the PCI-based fabric allows posted memory writes to pass memory reads. If OCP's strict ordering needs to be maintained, then write requests from OCP to PCI-based fabric need to be stalled at the PCI-based fabric primary interface for every read followed by a write sequence. Specifically, a write at the PCI-based fabric primary interface needs to be stalled until read completion of previously launched read request is returned to the PCI-based fabric-to-OCP bridge. This ensures writes never pass reads inside a PCI-based fabric and strict order can be maintained. In this context, Bridge does not implement OCP's strict ordering. In the PCI-based fabric-to-OCP bridge, writes are allowed to be pipelined behind reads on the PCI-based fabric primary interface.

The PCI-based fabric allows a memory read request to pass another memory read request (if requests have different Transaction IDs). However, OCP requires strict ordering of requests within a Thread. In one embodiment, the PCI-based fabric-to-OCP Bridge launches all read requests with the same Transaction ID (i.e., the same Requester ID and Tag) since the PCI-based fabric preserves strict ordering among read requests with the same Transaction ID.

OCP does not employ a retry mechanism. In addition, OCP has a strict in order pipe from a Master to a Slave. Now, consider the following scenario: There is a read request at the top of the in order queue to the PCI-based fabric followed by a sequence of writes such that the in order queue is full. There are no fabric credits for upstream non-posted requests. The downstream posted queue in the fabric could be full. So any downstream read completion would push downstream posted writes inside the PCI-based fabric. The downstream in order queue in the bridge towards OCP fabric (i.e., downstream buffers 412) could also be full of posted writes. Accordingly, from the OCP perspective, upstream posted writes into the PCI-based fabric domain would not make progress until downstream posted writes make progress towards the OCP domain, thereby creating an in out dependency. From the PCI-based fabric perspective looking into the bridge, such a dependency is avoided since there is only a single outstanding downstream read and resources for its read completion are pre-allocated.

Returning to block 204 of flowchart 200 in FIG. 2, under one embodiment conversion of downstream posted memory writes to non-posted memory writes are implemented as follows. For the producer-consumer model, the PCI-based fabric-to-OCP bridge converts all downstream posted memory writes into non-posted memory writes before launching them onto the OCP fabric and serializes them (i.e., as depicted in block 206).

In one embodiment, the PCI-based fabric-to-OCP bridge has four memory regions defined by configuration registers, while each memory region has an independent enable bit. When a downstream posted-memory write falls into an enabled memory region, the posted memory write is sent out on to the OCP fabric as a posted memory write. If a downstream posted memory write does not fall into any enabled region, it is converted to a non-posted memory write on the OCP fabric. In addition, independent of whether a write is posted or non-posted, the PCI-based fabric-to-OCP bridge's Master interface is configured, as per the OCP specification, to expect a response from OCP Fabric. In contrast, all writes in the upstream direction are posted and PCI-based fabric-to-OCP bridge does not provide any write response.

Exemplary Use Models

To better understand implementation of aspects of a PCI-based fabric-to-OCP or AHB fabric bridge, the following exemplary use models are provided. In no way should these use models be considered to limit an implementation of a such a bridge and associated transaction operations, but rather other use models may be readily practiced using similar architectures and techniques.

Figure 6A:
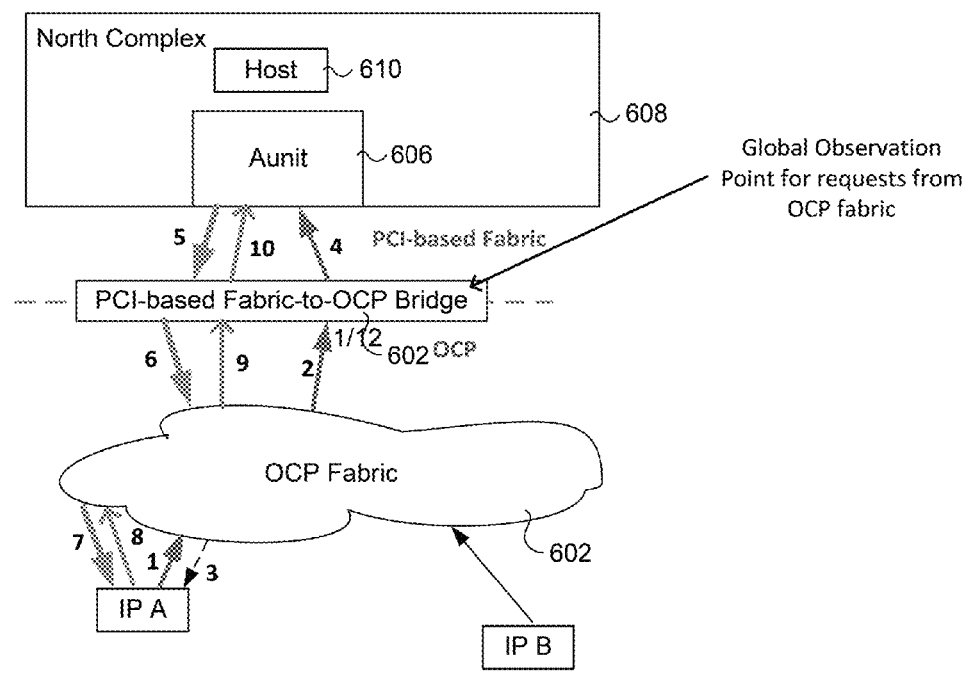
FIG. 6a is a combined schematic and message flow diagram illustrating a first exemplary transaction use model corresponding to memory writes with a response.
Figure 6B:
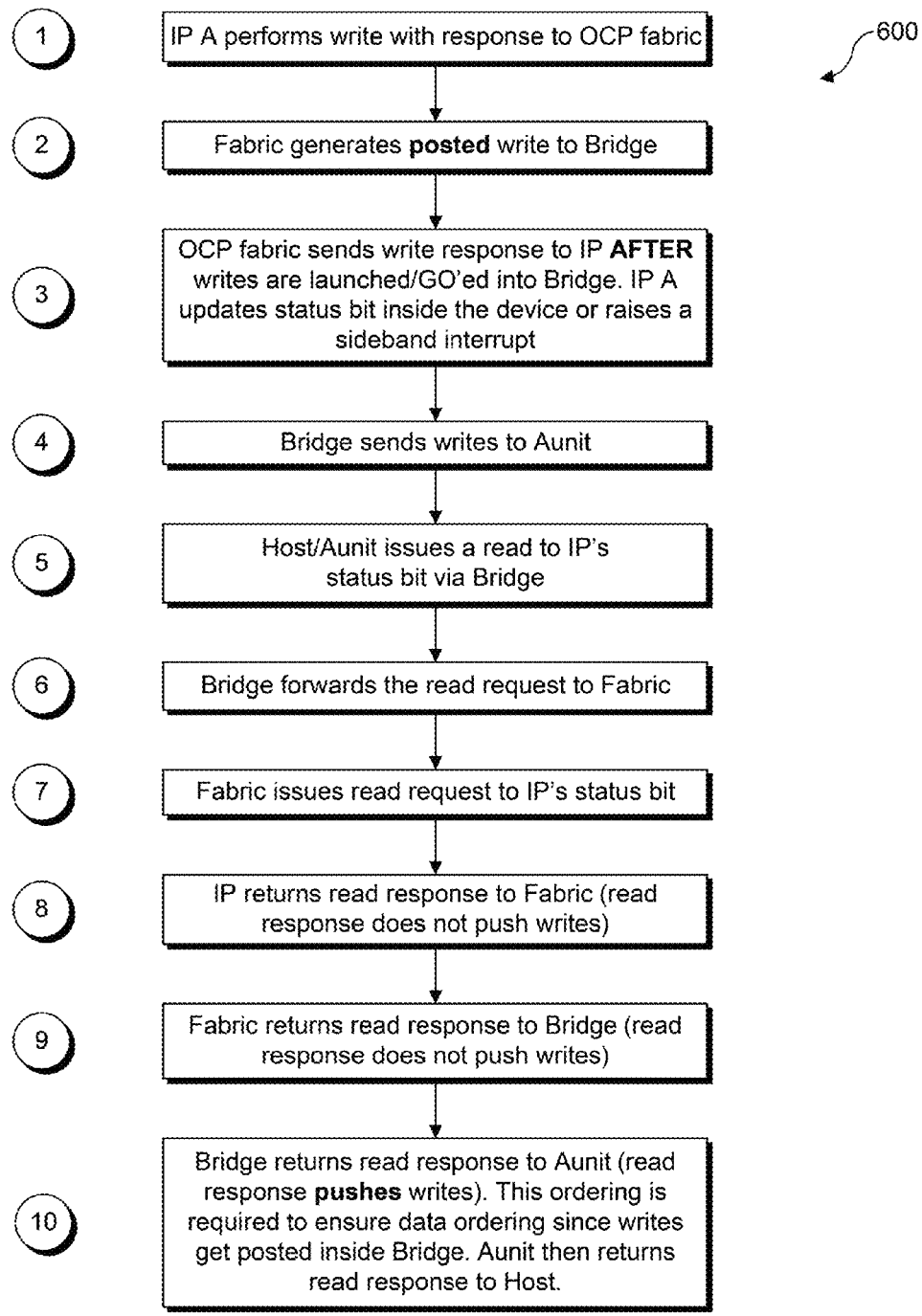

A first use model is illustrated in FIG. 6a, with FIG. 6b comprising a flowchart 600 depicting operations corresponding to the numbered operations in FIG. 6a. This use model corresponds to memory writes with a response. The process begins with operation 1 during which IP A performs one or more writes with (i.e., expecting) a response to OCP fabric 602. In operation 2, OCP fabric 602 generates posted write(s) to PCI-based fabric-to-OCP bridge 604. In operation 3, OCP fabric 602 sends the write response to IP A after writes are launched/GO'ed into PCI-based fabric-to-OCP bridge 604. In response, IP A updates status bit inside the device or raises a sideband interrupt.

At operation 4, PCI-based fabric-to-OCP bridge 604 sends the posted writes to an Aunit 606 in a North complex 608 including a host 610. In operation 5, the host/Aunit issues a read to IP A's status bit via PCI-based fabric-to-OCP bridge 604, while the bridge forwards the read request to OCP fabric 602 during operation 6. In operation 7, OCP fabric 602 issues a read request to IP A's status bit. IP A then returns a read response to OCP fabric 602, which forwards the read response to PCI-based fabric-to-OCP bridge 604, as depicted by operations 8 and 9. The read responses are independent of writes originating from IP connected to the OCP fabric, and thus do no push any writes. The process is completed in operation 10, during which PCI-based fabric-to-OCP bridge 604 returns the read response to Aunit 606. In this case, a read response may push writes into the PCI-based fabric. This ordering is required to ensure data ordering, since writes get posted inside of PCI-based fabric-to-OCP bridge 604. Aunit 606 then returns the read response to host 610.

Figure 7A:
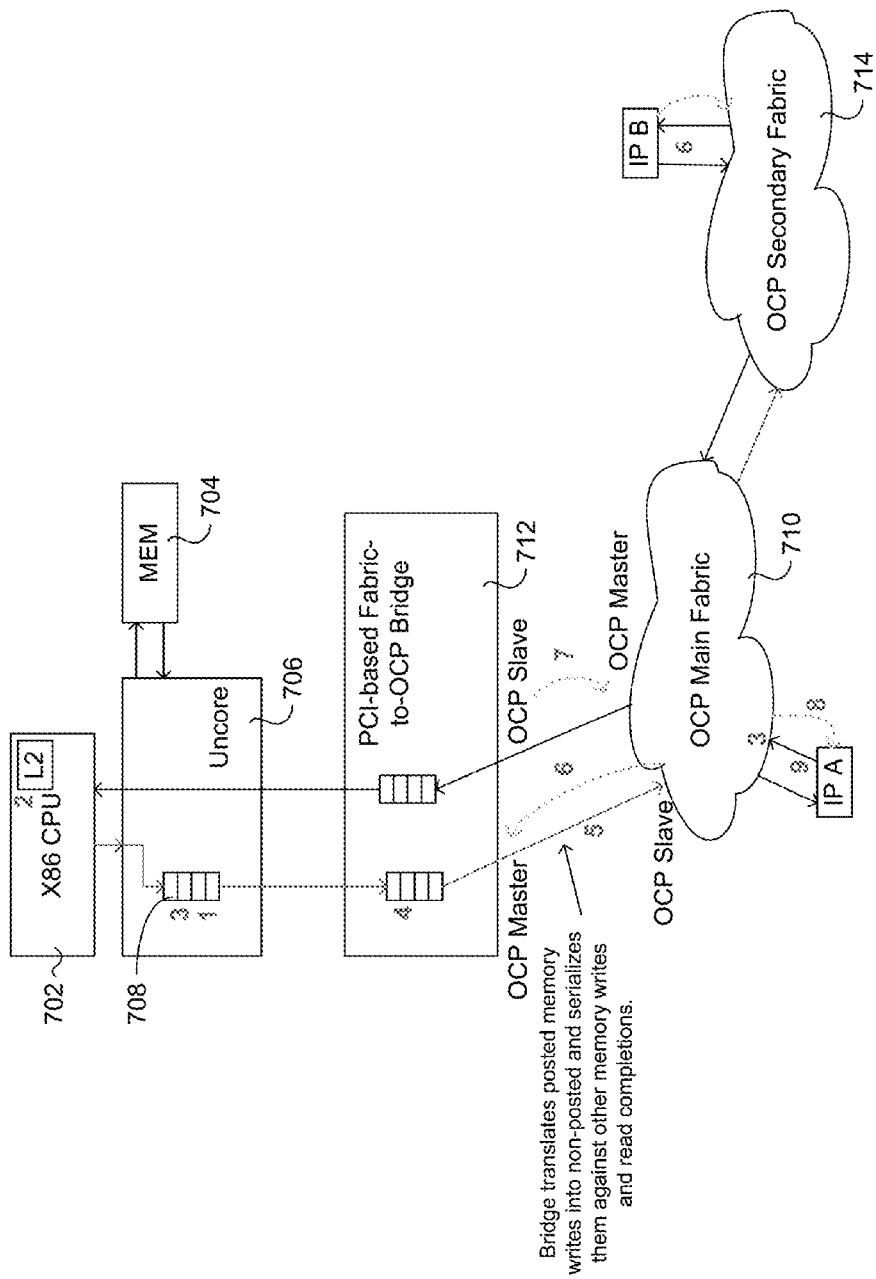
FIG. 7a is a combined schematic and message flow diagram illustrating a second exemplary transaction use model corresponding to a corresponding to a producer consumer scenario.
Figure 7B:
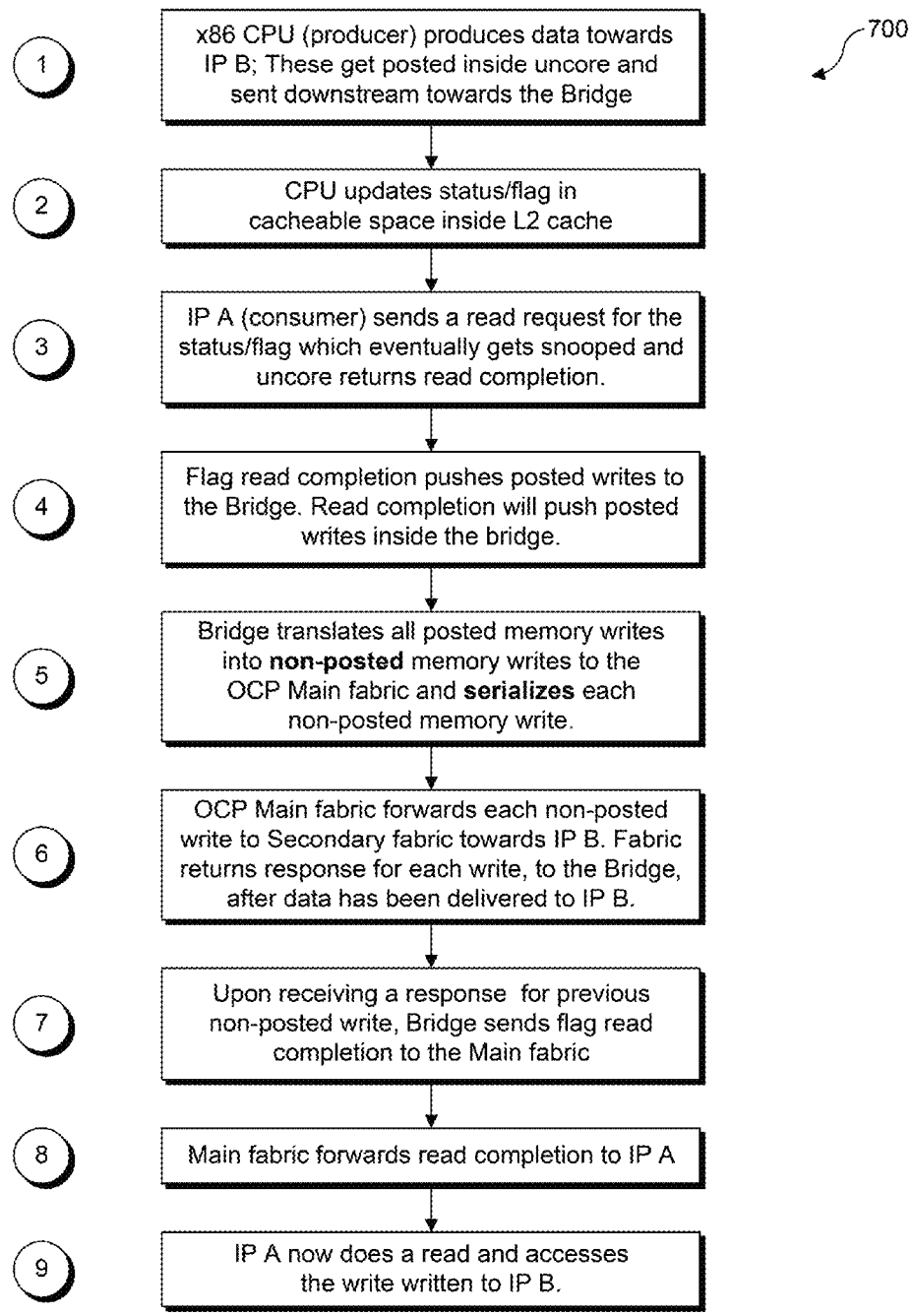

A second exemplary use model corresponding to a producer consumer scenario is depicted in FIG. 7a, with corresponding operations detailed in a flowchart 700 of FIG. 7b. The architecture in FIG. 7a includes an x86 CPU (Central Processing Unit) 702 an memory 704 coupled to an "uncore" 706 including a downstream buffer 708. Optionally, CPU 702 comprises an Intel® Atom® processor. The uncore includes a PCI-based fabric (not shown) that is coupled to an OCP main fabric 710 via a PCI-based fabric-to-OCP bridge 712. A secondary OCP fabric 714 is coupled to OCP main fabric 710. A first IP block (IP A) is coupled to OCP main fabric 710, while a second IP block (IP B) is coupled to secondary OCP fabric 714. Under the illustrated scenario, x86 CPU 702 is the producer, IP A is the consumer, the requested data is in IP B, and a corresponding status data or flag (referred to as status/flag) is stored in memory 704.

The process begins with operation 1, wherein the x86 CPU 702 (i.e., the producer) produces data towards IP B. These data get posted inside of uncore 706 and are sent downstream towards a PCI-based fabric-to-OCP bridge 710. During operation 2, x86 CPU 702 updates status/flag data in a cacheable space inside of its L2 cache. In operation 3, IP A (i.e., the consumer) sends a read request for the status/flag, which eventually gets snooped, and uncore 706 returns a read completion.

Continuing at operation 4, the flag read completion pushes the posted writes to PCI-based fabric-to-OCP bridge 712. Upon read completion, the posted writes will be pushed inside the bridge. At operation 5, PCI-based fabric-to-OCP bridge 712 translates all posted memory writes into non-posted memory writes to OCP main fabric 710 and serializes each non-posted memory write. Upon receiving each serialized non-posted memory write, OCP main fabric 710 forwards them to OCP secondary fabric 714 towards IP B, as shown in operation 6. OCP secondary fabric 714 (via OCP main fabric 710) returns a response for each write to PCI-based fabric-to-OCP bridge 712 after data has been delivered to IP B.

At operation 7, upon receiving a response for a previous non-posted write, PCI-based fabric-to-OCP bridge 712 sends a flag read completion to OCP main fabric 710. At operation 8, OCP main fabric 710 forwards the read completion to IP A, followed by IP A performing a read and accessing the write previously written by IP B, as depicted by operation 9.

Exemplary SoC and System Configurations

Figure 8:
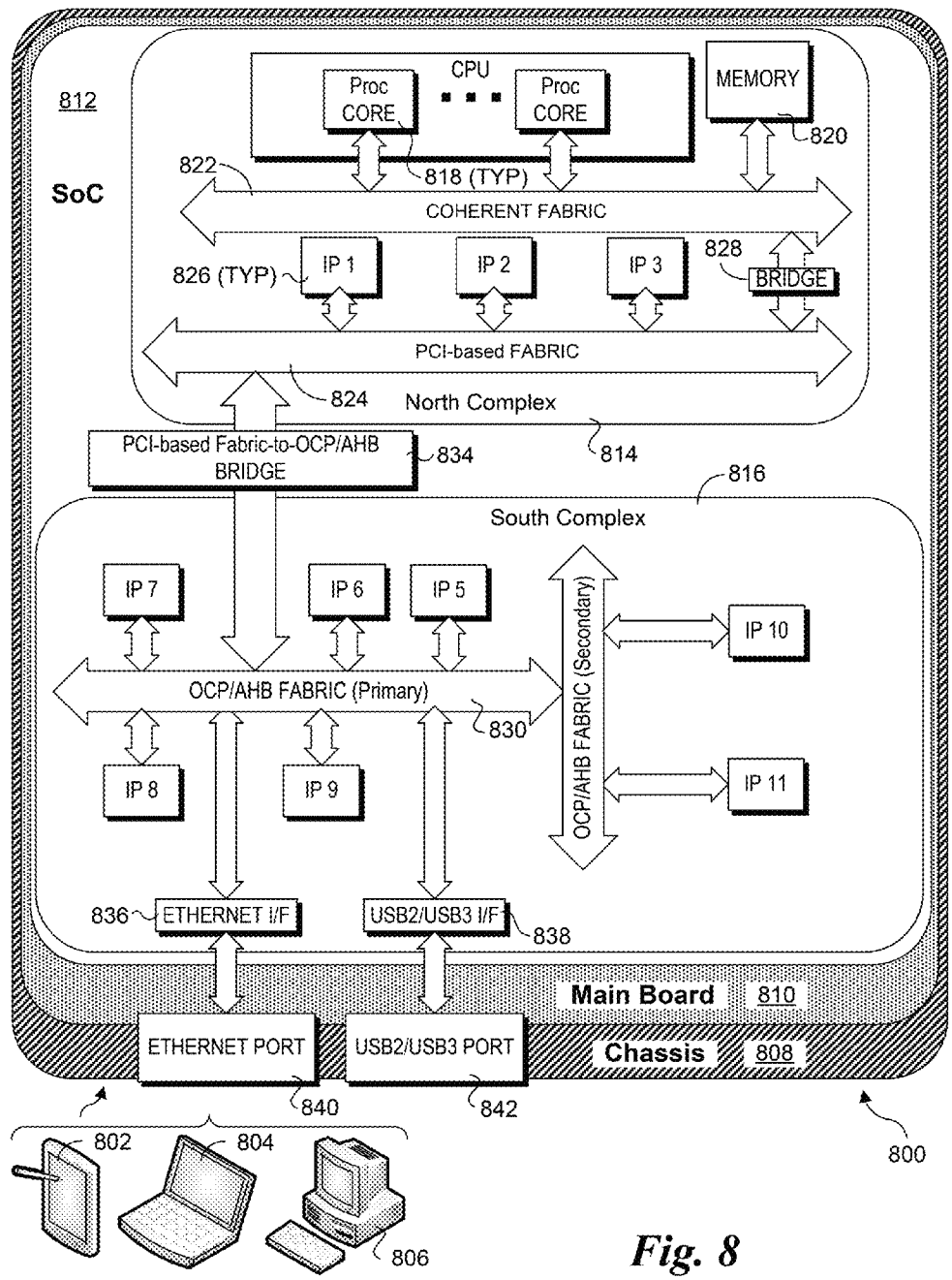
FIG. 8 is a schematic diagram illustrating a first exemplary computing device including an SoC having a North complex including a PCI-based fabric and a South complex comprising an ARM-based ecosystem.

The principles and teachings disclosed herein may be implemented on a variety of types of computing devices, including desktop computers, servers, laptops, notebooks, netbooks, ultrabooks, tablets, handheld computers, mobile phones, internet appliances, set-top boxes, etc. For example, FIG. 8 shows an exemplary implementation as applied to a computing device 800a, which is illustrative of a tablet 802, a notebook 804 and a desktop computer 806 (as well as other types of devices that are not shown). Each of these devices will typically include a chassis (i.e., housing) in which one or more printed circuit boards (and/or packaging substrates) are housed, including a main board or motherboard having one or more processors and various other types of circuits and components. For simplicity, these are depicted as a chassis 808 and a main board 810. The core processing operations are performed by a System on a Chip (SoC) 812, which is operationally coupled to main board 810 via a socket connector or through some other type of electromechanical coupling, such as flip-chip bonding.

SoC 812 is configured in an architecture that is roughly analogous to the ubiquitous North Bridge/South Bridge architecture used in personal computers and the like. However, when implemented on an SoC there are no external bridges (i.e., bridges facilitated through wired connections on main board 810), and thus the SoC is logically divided into a "North" complex 814 and a "South" Complex 816. The North complex includes high-speed components, such as processor cores, memory, graphic controllers, etc. These are depicted as processor cores 818 and memory 820. Memory 820 is actually illustrative of one or more memory controllers and/or last level caches, as well as corresponding cache coherency agents, as it will be recognized that the primary memory for computing devices of this type would typically comprise off-chip (meaning external to SoC 812) system memory, which is not shown for simplicity. In turn, each of the processor cores will typically have first and optionally second level caches (i.e., L1 and L2 caches, also not shown). Alternatively, memory 820 also represents SoC on-chip memory.

The use of multiple cores sharing system memory resources invokes the use of some type of memory coherency scheme. This is facilitated, in part, through the use of coherent (interconnect) fabric 822, which in one embodiment comprises a version of the Intel® QuickPath® Interconnect. In another embodiment, coherent fabric 822 comprises a Intel® Keiser Technology Interconnect®. Other coherent fabrics may be used, as well.

North complex 814 also includes several components that are coupled to a high speed interconnect, depicted as a PCI-based fabric 824. The components, which typically include graphics controllers and similar high-speed components, are depicted as Intellectual Property (IP) blocks 826, labeled IP 1, IP 2, and IP 3. As used herein, an IP block is representative of a block or logical group of circuitry that typically serves one or more targeted functions and comprise logic that is either developed in-house or licensed from a third-party. IP blocks are also referred to as functional blocks. A bridge 828 is also provided to interface signals between coherent fabric 818 and PCI-based fabric 824. As such, each of IP 1, IP 2, IP 3, and processor cores 818 are operatively coupled to PCI-based fabric 824 (i.e., either being directly connected to PCI-based fabric 824 or indirectly connected via coherent fabric 822 and bridge 828.

A South complex generally includes various types of IO (Input Output) interfaces and other components that operate at a lower clock rate than those in the North complex. These components will typically be coupled in communication via one or more busses, interconnects and/or interconnect fabrics, which for convenience is collectively depicted as a primary OCP/AHB fabric 830 and a secondary OCP/AHB fabric 832. Primary OCP/AHB fabric 830, in turn, is connected to the North complex via a PCI-based fabric-to-OCP/AHB fabric bridge 834. Under this nomenclature, it will be understood that the use of OCP/AHB means the corresponding fabric or bridge will comprise either an OCP fabric/bridge or an AHB fabric/bridge.

Various IP blocks are shown coupled to Primary OCP/AHB fabric 830, labeled IP 5, IP 6, IP 7, IP 8, and IP 9, while IP 10 and IP 11 are coupled to secondary OCP/AHB fabric 832. These IP blocks are illustrative of various components typically found in a South complex, such as IO controllers, audio controllers, disk controllers, and communication interfaces. Also shown are an Ethernet interface (I/F) 836 and a combination USB2/USB3 interface 838. These interfaces, in turn, are coupled to physical communication ports/connectors respectively comprising an Ethernet port 840 and a combination USB2/USB3 port 842, each of which is mounted on or operationally coupled to main board 810 and/or chassis 808 and accessible from outside chassis 808 (i.e., externally accessible to chassis 808).

Figure 8A:
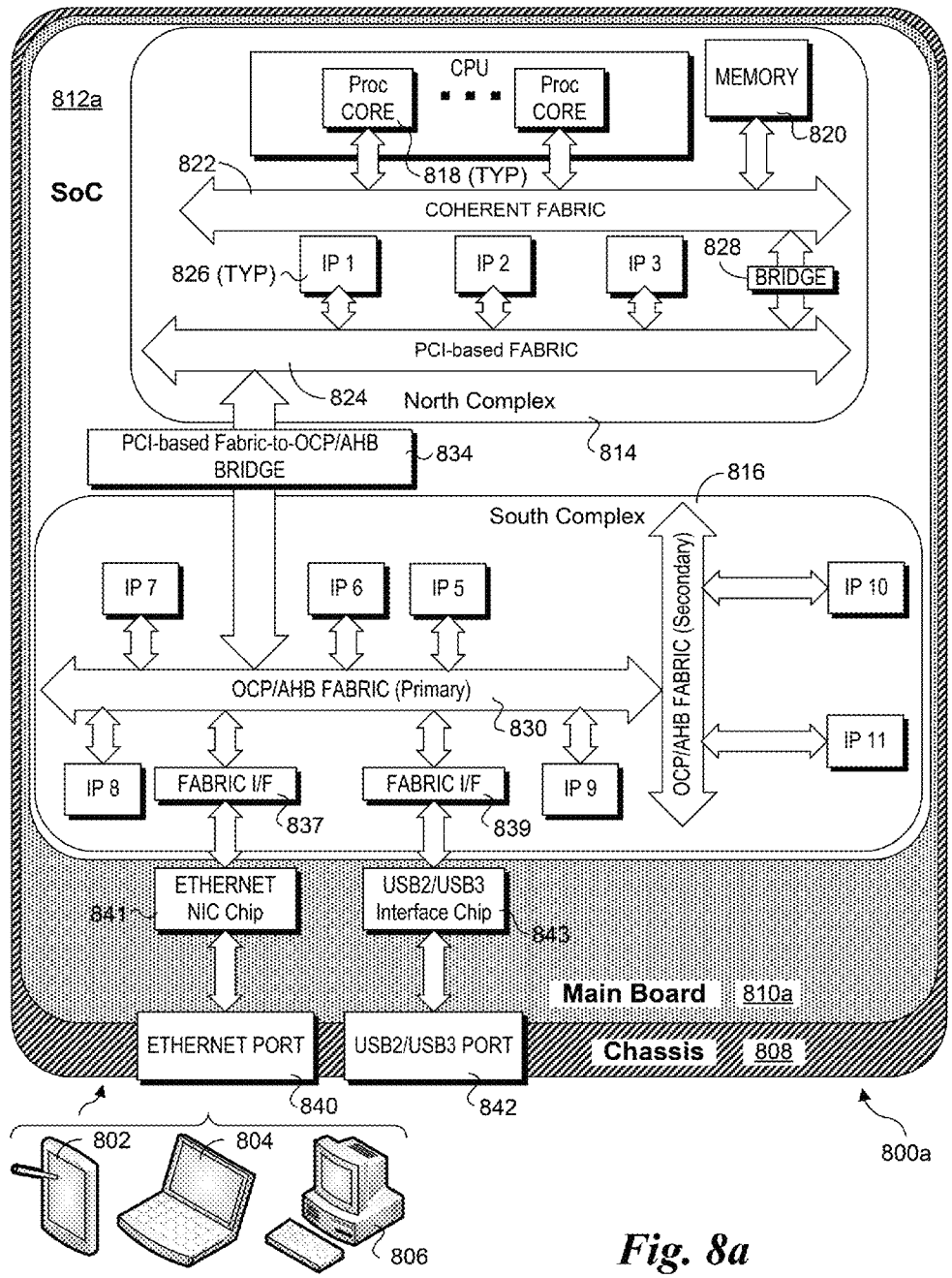
FIG. 8a is a schematic diagram illustrating an augmentation to the computing device of FIG. 8, wherein the Ethernet NIC and USB2/USB3 interfaces are implemented as separate chips coupled to the SoC.

FIG. 8a shows a computing device 800a having a slightly augmented configuration to computing device 800. More specifically, computing device 800a includes an main board 810a to which an SoC 812a, and Ethernet Network Interface Controller (NIC) chip 841 and a USB2/USB3 interface chip 843 are coupled. SoC 812 further includes OCP/AHB fabric interfaces 837 and 839, which are configured to provide an interface between primary OCP/AHB fabric 830 and each of Ethernet NIC chip 841 and USB2/USB3 interface chip 843. These interfaces are facilitated via wiring on main board 1010 that is configured to connect pins on SoC 1012a associated with to OCP/AHB fabric interfaces 837 and 839 to corresponding pins on Ethernet NIC chip 841 and a USB2/USB3 interface chip 843.

Figure 9:
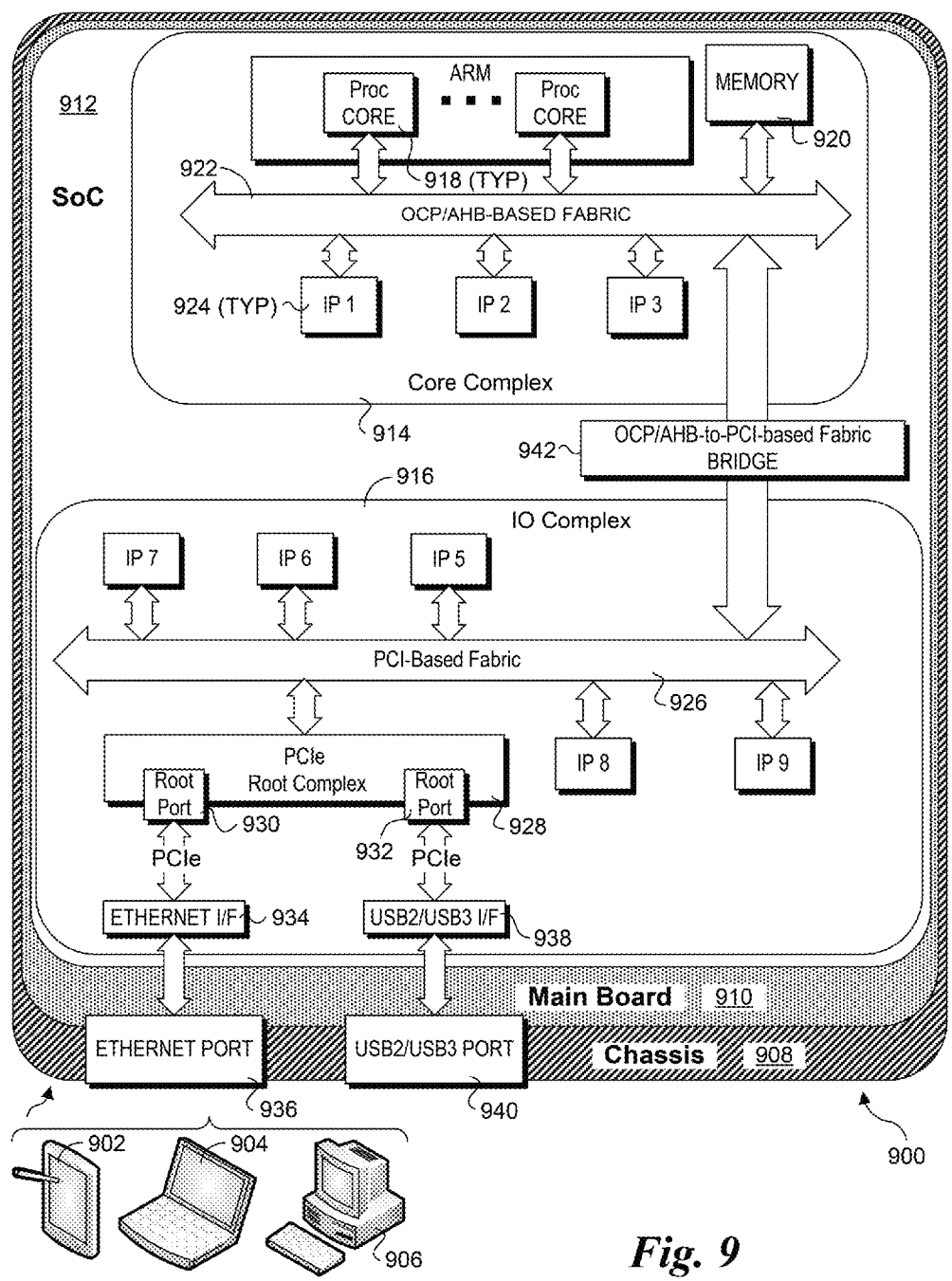
FIG. 9 is a schematic diagram illustrating a second exemplary computing device including an SoC having a core complex including an ARM-based ecosystem and an IO complex including a PCI-based fabric.

SoCs 812 and 812a of devices 800 and 800a are generally illustrative of an SoC architecture employing an x86-based CPU, although it is not limited to such CPUs. Another widely-used processor architecture employs a CPU with one or more ARM-based cores. An exemplary computing device 900 employing an SoC 912 with ARM-based cores 918 is shown in FIG. 9.

Computing device 900 is illustrative of a tablet 902, a notebook 904 and a desktop computer 906 (as well as other types of devices that are not shown), and includes a main board 910 housed in a chassis 908. As before, core processing operations are performed by a System on a Chip (SoC) 912, which is operationally coupled to main board 910 via a socket connector or through some other type of electromechanical coupling, such as flip-chip bonding.

The architecture for SoC 912 is logically divided into a core complex 914 and an IO complex 916. Core complex 914 is roughly analogous to North complex 814, and includes high-speed components, such as processor cores, memory, graphic controllers, etc. These are depicted as processor cores 918 and memory 920, which are depicted as being coupled to an OCP/AHB fabric 922. Optionally, the processor cores and memory are coupled to a coherent fabric that is coupled to OCP/AHB fabric 922 via a bridge in a manner similar to the configuration shown in North complex 814 of SoC 812. A plurality of IP blocks 924 are also connected to OCP/AHB fabric 922.

IO complex 916 is roughly analogous to South complex 816, and includes various types of IO interfaces, interconnects/buses, and IP blocks. In the illustrated example, IO complex 916 includes a PCI-based fabric 926 to which IP blocks IP 5, IP 6, IP 7, IP 8, and IP 9 are coupled. Also coupled to PCI-based fabric 926 is a PCIe root complex 928 including root ports 930 and 932. In turn, root port 930 is connected to a PCIe Ethernet Interface 934 to which an Ethernet port 936 is coupled, while root port 932 is connected to a PCIe USB2/USB3 interface 938 to which a USB2/USB3 interface 940 is coupled.

PCI-based fabric 926 is coupled to OCP/AHB-based fabric 922 via an OCP/AHB-to-PCI-based fabric bridge 942. As before, the use of OCP/AHB means one of an OCP or AHB fabric/bridge is used. For example, if fabric 922 comprises an AHB fabric, bridge 942 would comprise an AHB-to-PCI-based fabric bridge.

Figure 9A:
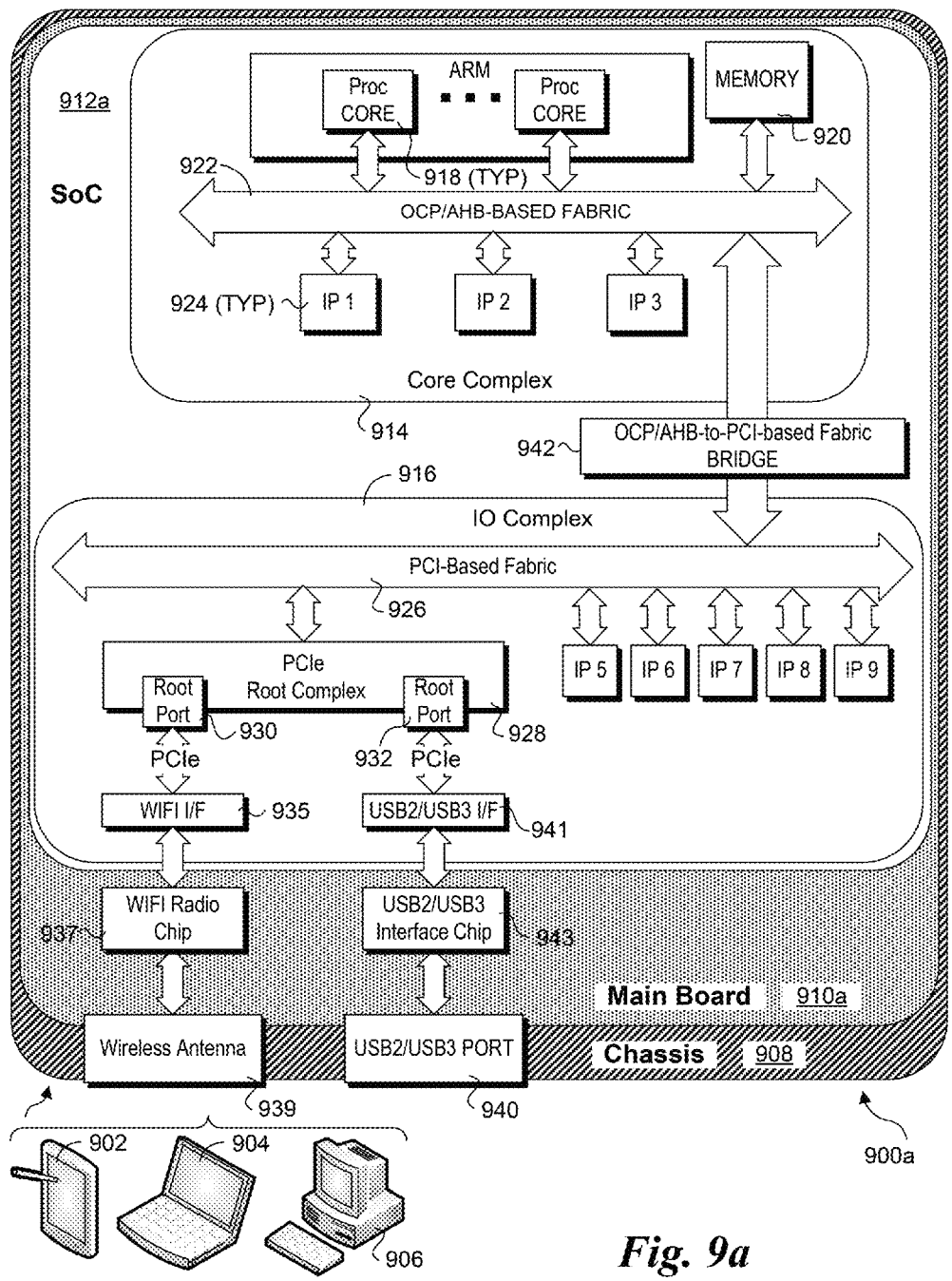
FIG. 9a is a schematic diagram illustrating an augmentation to the computing device of FIG. 9, wherein a WiFi Radio and USB2/USB3 interfaces are implemented as separate chips coupled to the SoC.

FIG. 9a depicts a computing device 900a configured as an augmentation to computing device 900. In further detail, computing device 900a includes a main board 910a to which an SoC 912a, a WiFi radio chip 937, and a USB2/USB3 interface chip are mounted or otherwise operatively coupled. SoC 912a further includes a WiFi interface 935 and a USB2/USB3 interface 941, which are respectively coupled to WiFi radio chip 937, and USB2/USB3 interface chip via wiring on main board 910a connecting pins on SoC 912a to corresponding pins on WiFi radio chip 937 and USB2/USB3 interface chip 943. In turn, WiFi radio chip 937 is connected to a wireless antenna 939, while USB2/USB3 interface chip 943 is connected to USB2/USB3 port 940.

In addition to configurations having an SoC bounded or socketed to a main board such as depicted in FIGS. 8, 8a, 9, and 9a, computing devices implementing aspects of the embodiments described herein may be configured using other types of chip/component configurations. For example, a computing device such as a mobile phone or tablet may include one or more multi-chip modules. Additionally, various types of IO peripheral interfaces and/or peripheral components are implemented either as part of an integrated system chip (e.g., part of an SoC), or in a discrete component, such as a wireless radio chip or other type of communications chip.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. An apparatus comprising:
   a first fabric comprising a Peripheral Component Interconnect (PCI)-based fabric to which a first plurality of Intellectual Property (IP) blocks are coupled;
   a second fabric comprising one of an Open Core Protocol (OCP) or an Advanced Microcontroller Bus Architecture (AMBA)-based fabric to which a second plurality of IP blocks are coupled; and
   a fabric-to-fabric bridge configured to facilitate transfer of data between the first fabric and the second fabric and configured to convert a posted memory write transaction originating from the first fabric into a non-posted memory write transaction and serialize the non-posted memory write transaction upon forwarding the transaction towards the second fabric.

2. The apparatus of claim 1, wherein the fabric-to-fabric bridge is further configured to serialize read returns towards the second fabric, wherein the fabric-to-fabric bridge does not return read data to the second fabric until a previous non-posted write towards the first fabric completes.

3. The apparatus of claim 1, wherein the fabric-to-fabric bridge is further configured to convert a non-posted memory write transaction into a posted transaction and forward the posted transaction to the first fabric.

4. The apparatus of claim 1, wherein the fabric-to-fabric bridge is further configured to push posted memory writes from the second fabric to ensure read completion from the second fabric.

5. The apparatus of claim 1, further comprising at least one ARM-based processor core, operatively coupled to the second fabric.

6. The apparatus of claim 1, further comprising at least one x86-based processor core operatively coupled to the first fabric.

7. The apparatus of claim 6, wherein the apparatus further comprises:
   a coherent fabric to which a plurality of x86-based processor cores are coupled; and
   a bridge, coupled between the PCI-based fabric and the coherent fabric.

8. The apparatus of claim 1, further comprising a third fabric coupled to the second fabric, the third fabric comprising one of a secondary OCP fabric or a secondary AMBA-based fabric.

9. The apparatus of claim 1, wherein the fabric-to-fabric bridge includes:
   a first First-in First out (FIFO) buffer comprising a downward command queue; and
   a second FIFO buffer comprising a downward data queue.

10. The apparatus of claim 9, wherein the fabric-to-fabric bridge includes:
    a third FIFO buffer comprising an upward command queue; and
    a fourth FIFO buffer comprising an upward data queue.

11. The apparatus of claim 10, wherein the fabric-to-fabric bridge further comprises a clock crossing domain.

12. The apparatus of claim 1, wherein the second fabric comprises an OCP fabric and the apparatus comprises:
    a PCI ordering domain;
    a First-in First-out (FIFO) ordering domain; and
    an OCP ordering domain.

13. A computing device, comprising:
    a main board on which a plurality of components are mounted or operatively coupled, the plurality of components including,
        a communications chip; and
        a System on a Chip (SoC), comprising,
            a first fabric comprising a Peripheral Component Interconnect (PCI)-based fabric to which a first plurality of Intellectual Property (IP) blocks are coupled;
            a second fabric comprising one of an Open Core Protocol (OCP) or an Advanced Microcontroller Bus Architecture (AMBA)-based fabric to which a second plurality of IP blocks are coupled; and
            a fabric-to-fabric bridge configured to facilitate transfer of data between the first fabric and the second fabric and configured to convert a posted memory write transaction originating from the first fabric into a non-posted memory write transaction and serialize the non-posted memory write transaction while forwarding the transaction towards the second fabric,
        wherein one of the first and second plurality of IP blocks further comprises a communication interface coupled to the communication chip via wiring in the main board.

14. The computing device of claim 13, wherein the fabric-to-fabric bridge is further configured to serialize read returns towards the second fabric, wherein the fabric-to-fabric bridge does not return read data to second fabric until a previous non-posted write towards the first fabric completes.

15. The computing device of claim 13, wherein the fabric-to-fabric bridge is further configured to convert a non-posted memory write transaction into a posted transaction and forward the posted transaction to the PCI-based fabric.

16. The computing device of claim 13, wherein the second fabric is further configured to convert a non-posted memory write transaction into a posted transaction and forward the posted transaction to the fabric-to-fabric bridge.

17. The computing device of claim 13, wherein the fabric-to-fabric bridge is further configured to push posted memory writes from the second fabric to ensure read completion from the second fabric.

18. The computing device of claim 13, wherein the SoC comprises at least one ARM-based processor core operatively coupled to the second fabric, and the communication chip comprises a PCI Express (PCIe) device coupled to the communication interface via a PCIe link.

19. The computing device of claim 18, wherein the communication chip comprises a wireless communications chip.

20. A method, comprising
originating a write memory transaction from a first component operatively coupled to a first fabric comprising a Peripheral Component Interconnect (PCI)-based fabric, a first write memory transaction comprising a posted memory write transaction and being targeted to a second component operatively coupled to a second fabric comprising one of an Open Core Protocol (OCP) or an Advanced Microcontroller Bus Architecture (AMBA)-based fabric that is coupled to the first fabric via a fabric-to-fabric bridge; and
at the fabric-to-fabric bridge, converting the posted memory write transaction into a non-posted memory write transaction and serializing the non-posted memory write transaction while forwarding the transaction towards the second fabric.

21. The method of claim 20, further comprising:
serializing read returns towards the second fabric, wherein the fabric-to-fabric bridge does not return read data to the second fabric until a previous non-posted write towards the first fabric completes.

22. The method of claim 20, further comprising:
creating a programmable window in system memory space accessible to the fabric-to-fabric bridge; and
streaming and/or pipelining memory writes as posted transactions via the programmable window.

23. The method of claim 20, further comprising:
converting, at the fabric-to-fabric bridge, a non-posted memory write transaction originating from a second component operatively coupled to the second fabric into a posted transaction and forwarding the posted transaction to the first fabric.

24. The method of claim 20, further comprising:
converting, at the second fabric, a non-posted memory write transaction originating from a second component operatively coupled to the second fabric into a posted transaction and forwarding the posted transaction to the fabric-to-fabric bridge.

25. The method of claim 20, wherein the method is implemented on a System on a Chip (SoC) comprising at least one ARM-based processor core operatively coupled to the second fabric.

26. An apparatus comprising:
a first interconnect fabric to which a first plurality of Intellectual Property (IP) blocks are coupled, wherein the first interconnect fabric is configured to support posted memory write transactions;
a second interconnect fabric to which a second plurality of IP blocks are coupled, wherein the second interconnect fabric is configured to support non-posted memory write transactions; and
a fabric-to-fabric bridge configured to:
  facilitate transfer of information between the first interconnect fabric and the second interconnect,
  convert a posted memory write transaction from the first interconnect fabric into a non-posted memory write transaction, and
  serialize the non-posted memory write transaction upon sending the transaction towards the second interconnect fabric.

27. The apparatus of claim 26, wherein the fabric-to-fabric bridge is further configured to serialize read returns towards the second fabric, wherein the fabric-to-fabric bridge does not return read data to the second fabric until a previous non-posted write towards the first fabric completes.

28. The apparatus of claim 26, wherein the fabric-to-fabric bridge is further configured to convert a non-posted memory write transaction into a posted transaction and forward the posted transaction to the first fabric.

29. The apparatus of claim 26, wherein the fabric-to-fabric bridge is further configured to push posted memory writes from the second fabric to ensure read completion from the second fabric.

30. The apparatus of claim 26, wherein the fabric-to-fabric bridge includes:
a first First-in First out (FIFO) buffer comprising a downward command queue; and
a second FIFO buffer comprising a downward data queue.

31. The apparatus of claim 30, wherein the fabric-to-fabric bridge includes:
a third FIFO buffer comprising an upward command queue; and
a fourth FIFO buffer comprising an upward data queue.

32. The apparatus of claim 31, wherein the fabric-to-fabric bridge further comprises a clock crossing domain.

33. The apparatus of claim 26, wherein the second fabric comprises an Advanced Microcontroller Bus Architecture (AMBA)-based fabric to which at least one ARM-based processor core is operatively coupled.

34. The apparatus of claim 26, wherein the first fabric comprises a Peripheral Component Interconnect (PCI)-based fabric, further comprising at least one x86-based processor core operatively coupled to the first fabric.

35. The apparatus of claim 34, wherein the apparatus further comprises:
a coherent fabric to which a plurality of x86-based processor cores are coupled; and
a bridge, coupled between the PCI-based fabric and the coherent fabric.

36. The apparatus of claim 26, wherein the second fabric comprises one of an Open Core Protocol (OCP) fabric or an Advanced Microcontroller Bus Architecture (AMBA)-based fabric, further comprising a third fabric coupled to the second fabric, the third fabric comprising one of a secondary OCP fabric or a secondary AMBA-based fabric.

37. The apparatus of claim 26, wherein the second fabric comprises an Open Core Protocol (OCP) fabric and the apparatus comprises:
a PCI ordering domain;
a First-in First-out (FIFO) ordering domain; and
an OCP ordering domain.

* * * * *